United States Patent [19]

Redding

[11] 4,305,283
[45] Dec. 15, 1981

[54] POSITION DETERMINING APPARATUS

[75] Inventor: Robert J. Redding, Maidenhead, England

[73] Assignee: Whessoe Limited, Durham, England

[21] Appl. No.: 70,837

[22] Filed: Aug. 29, 1979

[51] Int. Cl.³ ................... G01F 23/00; G01R 33/18; G01B 7/00
[52] U.S. Cl. ................... 73/290 V; 73/313; 324/208; 324/225; 340/870.19
[58] Field of Search ............ 73/290 V, 308; 340/624, 340/182, 191; 324/208, 209; 333/148

[56] References Cited

U.S. PATENT DOCUMENTS

| | | | |
|---|---|---|---|
| 3,154,946 | 11/1964 | Ordorica et al. | 73/313 |
| 3,208,281 | 9/1965 | Kalmus et al. | 73/290 V X |
| 3,372,592 | 3/1968 | Gravert | 73/290 V X |
| 3,678,750 | 7/1972 | DiNola et al. | 73/313 |
| 4,006,637 | 2/1977 | Kinosita | 73/313 |
| 4,028,619 | 6/1977 | Edwards | 333/148 X |
| 4,071,818 | 1/1978 | Krisst | 324/219 |
| 4,158,964 | 6/1979 | McCrea et al. | 73/290 V |

FOREIGN PATENT DOCUMENTS

| | | | |
|---|---|---|---|
| 977913 | 12/1964 | United Kingdom | 324/208 |
| 1386070 | 3/1975 | United Kingdom | 340/365 |
| 1466246 | 3/1977 | United Kingdom | 324/208 |

Primary Examiner—Daniel M. Yasich
Attorney, Agent, or Firm—Kemon & Estabrook

[57] ABSTRACT

A position determining apparatus comprising a taut electrically-conductive member; a pulse generator to feed a pulse of electric current along the member; a magnet located at a variable first point along the member, for example on a float on the surface of a liquid the level of which is to be determined, to apply a magnetic field to the member at that point; and a transducer positioned at a second point along the member to sense the arrival at the second point of a mechanical impulse induced in the member by interaction between the current pulse and the magnetic field as the current pulse passes the magnet. A time measuring circuit responsive to the time interval between the feeding of the current pulse and the arrival of the mechanical impulse at the second point is used to determine the position of the first point.

11 Claims, 1 Drawing Figure

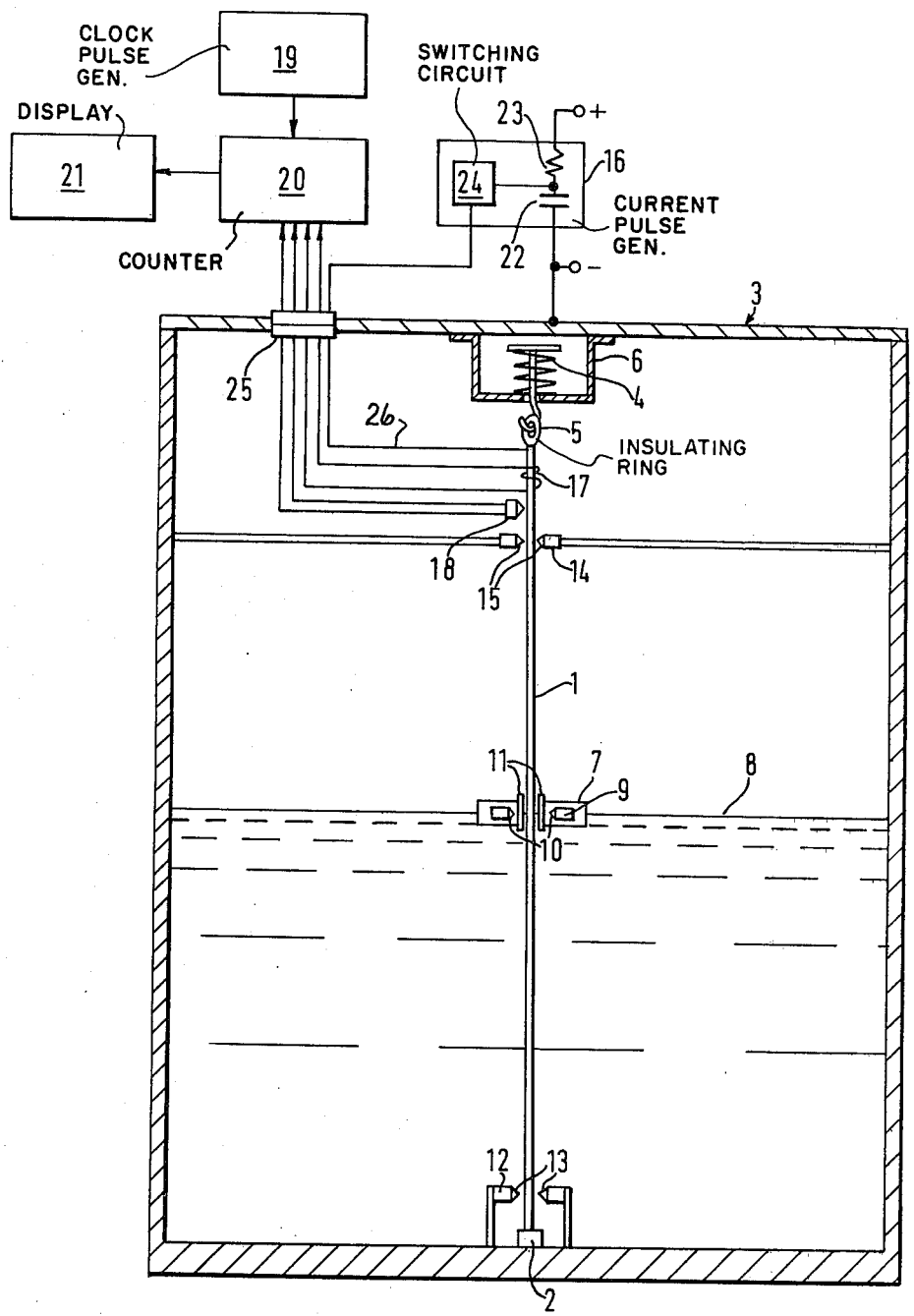

POSITION DETERMINING APPARATUS

This invention relates to position determining apparatus, and particularly, but not exclusively, to apparatus for determining the position of a float in a liquid level indicating system.

In conventional apparatus for indicating the level of a liquid, for example in a tank, a float resting on the surface of the liquid is connected by a wire or chain to a level sensing mechanism so that movements of the float, due to changes in the liquid level, are communicated to the mechanism. The mechanism may register and/or indicate the height of the level, and may produce electrical signals corresponding to the height of the level.

Such apparatus suffers from a number of disadvantages. It is particularly susceptible to sluggishness due to friction in the various moving parts.

The use of electrical sensing devices, such as float-controlled variable resistors, can reduce the friction problems, but if the liquid is flammable considerable precautions must be taken to prevent ignition of the liquid by electrical sparks. A currently-used method of dealing with this problem is to extend a mechanical linkage through the wall of the tank via a gland or a seal and to connect the linkage to electrical sensing and indicating equipment outside the tank, away from the flammable liquid and its possibly explosive vapour. However, such a linkage is again prone to friction problems.

It is an object of the present invention to provide an improved position determining apparatus, which is especially, but not exclusively, useful in determining the height of the level of a liquid.

According to the invention, position determining apparatus comprises a taut elongate electrically-conductive member; means to feed a pulse of electric current along the member; a magnet located at a first point along the member to apply a magnetic field to the member at that point, the position of which point is to be determined; means positioned at a second point along the member to sense the arrival at said second point of a mechanical impulse applied to the member by interaction between the current pulse and the magnetic field as the current pulse passes the magnet; and means responsive to the time interval between the feeding of the current pulse and the arrival of the mechanical impulse at said second point to determine said position.

An embodiment of the invention will now be described, by way of example, with reference to the accompanying schematic drawing.

Referring to the drawing, an elongate electrically conductive member, such as a 2 m.m. diameter stainless steel wire 1, is held taut between an electrically conductive fixing 2 at the base of a tank 3 and the roof of the tank by a compression spring 4 which is insulated from the wire 1 by a ring 5 of electrically-insulating material. The spring 4 is mounted on a bracket 6 attached to the tank roof.

A float 7 floats on the surface 8 of a liquid which is contained in the tank when the apparatus is in use. A semicircular magnet 9 is mounted in the float and has radial pole pieces 10 at its ends to concentrate the magnetic flux at a point in the wire. The position of this point is dependent upon the height of the liquid level. In order to allow the float 7 to slide smoothly up and down the wire 1 as the liquid level changes, part-annular polytetrafluorethylene guides 11 are fitted at the centre of the float.

A further magnet 12 with radial pole pieces 13 is provided to apply a magnetic field to the wire 1 at a point just below the lowest expected liquid level. A magnet 14 with pole pieces 15 is similarly provided just above the highest excepted liquid level. The function of the magnets 12 and 14 will be described later.

A current pulse generating circuit 16 is connected across the ends of the wire 1 to apply current pulses periodically to the wire. Each pulse applied to the wire travels along the wire at the speed of light, and when the pulse passes the pole pieces 10 of the magnet 9, a mechanical impulse is induced in the wire 1 due to the interaction of the current flow and the magnetic field (following the well-known "left-hand rule" as applied to electric motors). A coil 17 is inductively coupled to the wire 1 to sense the time of application of the current pulse. This coil is conveniently positioned near the roof of the tank, away from the liquid.

The mechanical impulse travels at the speed of sound in both directions along the wire 1 from the position of the magnet 9. A transducer 18, also conveniently positioned near the roof of the tank, is mechanically coupled to the wire 1 to sense the arrival thereat of the mechanical impulse. The transducer 18 may be, for example, a piezoceramic or bimorph microphone. Guard transducers (not shown) may be positioned above and below the transducer 18 and connected to circuitry responsive to the correct direction of travel of the impulse, to distinguish from spurious vibrations in the rod.

A clock pulse generator 19 feeds clock pulses continuously to a counter 20. The coil 17 is connected to a START input of the counter, and the transducer 18 is connected to a STOP input. It is convenient, but not essential, that the current pulse generator 16, the clock pulse generator 19 and the counter 20 are positioned outside the tank 3, the current pulses and the stop and start signals being fed via a connector 25 mounted in the roof or side wall of the tank.

In operation of the apparatus, the float 7 moves up and down with the liquid level, guided by the wire 1. A current pulse is applied to the wire by the generator 16 and an output signal is induced in the coil 17 by the current flow. This signal initiates the counting of the clock pulses. The current pulse passing the magnet 9 in the float 7 induces a mechanical impulse in the wire as explained above, and the arrival of this impulse at the transducer 18 causes the generation of a pulse which stops the counting of the clock pulses.

The clock pulse count represents the distance between the float 7 and the transducer 18 and hence varies inversely with the height of the liquid level. A display 21 connected to the counter 20 can be calibrated to give the liquid level height directly.

An indication of the various operating parameters can be seen from the following example. The speed of sound in a steel wire is approximately 5700 meters per second. If the length of the wire between the transducer 18 and the magnet 9 for an average liquid level is 15 meters, the time interval between application of the current pulse and arrival of the mechanical impulse will be (15 divided by 5,700) seconds, which equals 2.63 milliseconds. If the clock pulse frequency is made 57 MHz, a change in liquid level of 1 millimeter will give rise to a change in clock pulse count of 10 Hz. Such a change in the count can easily be resolved by modern electronic counters.

Changes in ambient temperature and/or pressure will change the speed of sound in the wire 1, thereby introducing errors in the indicated position of the float. Temperature and pressure sensors (not shown) may be incorporated in the apparatus, together with circuitry for correcting the count in dependence upon the deviation of the temperature and/or pressure from datum values.

However, the additional magnets 12 and 14 provide automatic compensation for such changes. Since the magnets 12, 9 and 14 are spaced apart, along the wire 1, three spaced-apart mechanical impulses will be sensed by the transducer 18. The sensing of the first impulse, corresponding to the passage of the current pulse past the magnet 15, can be made to start a first clock pulse counting circuit within the counter 20. Sensing of the second impulse can then stop this first counting circuit and simultaneously start a second counting circuit within the counter 20. The third impulse then stops the second counting circuit. The ratio of the counts in the two counting circuits will then be the same as the ratio of the distances between the successive pairs of magnets, irrespective of the absolute speed of sound in the wire. Since the distance between the magnets 12 and 14 is fixed, the height of the level can readily be calculated from the ratio of the counts. Suitable circuitry can be provided to perform this calculation, so that the display indicates the level height directly.

The current pulses applied to the wire 1 by the generator 16 need only be of the order of 1 watt, and this power can be supplied to the generator 16 via, for example, a safety barrier a described in my British Pat. No. 977,913. The current pulses will be short, high amplitude pulses, and such pulses can be generated by charging and discharging a capacitor. The generator 16 is shown as comprising a capacitor 22 which is charged via a resistor 23 from a d.c. supply. The negative d.c. supply line is connected to the tank 3. The capacitor is discharged into the wire 1 periodically, for example at 1 second intervals, by an automatic electronic switching circuit 24 via a line 26 which is connected to the wire 1, for example, by brazing. The line 26 forms a first connection means electrically connected to the wire 1 and the fixing 2 provides a second such connection means, the connection means being at respective connection points spaced apart along the wire 1. The current pulses from the pulse generator 16 are, therefore, fed along the wire 1 from the connection means 26 to the connection means 2 and thence via the electrically conductive tank 3 to the negative d.c. supply line. My British Pat. No. 1,466,246 describes a pulse generator circuit operating on this capacitor charge and discharge principle. Since the energy level is low, the supply can be intrinsically safe, and ignition of the liquid and of any associated vapour in the tank cannot be caused by the circuit. The circuit can, therefore, be contained within the tank, if necessary. The wire 1 may be encapsulated.

The wire 1 need not be made of stainless steel. In fact, any elongate electrically-conductive member may be used. For example, the member might comprise a rigid core with a high-conductivity outer sheath. The material of the member may be chosen to suit the particular liquid so that the need for temperature compensation is obviated.

It should be noted that the wire 1 will act as a guide for the float 7 and that the electrical pulse will in fact apply a small force to the float. It is thus feasible to ascertain from the nature of the mechanical impulse whether the float is free or is mechanically impeded.

Conversely, by applying the current pulses with the appropriate phase relationship, the forces on the float can cause it to build up into an oscillation. Similarly, by reversing the direction of the current pulse, and by appropriate timing, the pulses can add or subtract in their mechanical effect. Such variations not only confirm that the float is accurately at the surface but also given confirmation of the measurement since one can measure from the top of the tank down to the liquid level or from the bottom of the tank up to the level. There are advantages in using whichever of these is the smaller, since a unit change in level would give a larger proportional change in signal.

Although the position determination apparatus of the present invention has been described above in relation to the sensing of the position of a float on the surface of a liquid, it could be applied to the sensing of the position of any member which can carry a magnet and which can be moved along an elongate electrically-conductive member.

I claim:

1. Position determining apparatus, comprising a taut elongate electrically-conductive member; first and second connection means electrically-connected to said member at respective connection positions spaced apart along said member; a first magnet variably positioned to apply a first magnetic field to said member at a first point located anywhere between said connection positions, the position of which said first point along said member is to be determined; a pulse generator connected to said first connection means and operable to feed a pulse of electric current along said member from said first connection means to the other, which current pulse interacts with said first magnetic field as said current pulse travels past said first point thereby causing a mechanical impulse to propagate along said member; means positioned at a second point along said member to sense the arrival of said mechanical impulse at said second point; and transducer means located along said member to be responsive to said arrival of said mechanical impulse at said second point to determine said position of said first point.

2. Apparatus as claimed in claim 1, wherein said means responsive to said arrival of said mechanical impulse comprises a clock pulse generator; and a counter which is operative to count the number of clock pulses generated between said feeding of said current pulse and said arrival of said mechanical impulse at said second point.

3. Apparatus as claimed in claim 2, including a coil inductively coupled to said member and operative to feed a START signal to said counter to initiate the counting of said clock pulses in response to feeding of said current pulse.

4. Apparatus as claimed in claim 3, wherein said means to sense said arrival of said mechanical impulse comprises a transducer operative to feed a STOP signal to said counter to stop said counting of said clock pulses in response to said arrival of said mechanical impulse.

5. Apparatus as claimed in claim 2, including a display device connected to said counter to display a representation of said position.

6. Apparatus as claimed in claim 1, further comprising second and third magnets located respectively at fixed third and fourth points along said member to apply second and third magnetic fields, respectively, to said member, said third point being between said first and second points, and said fourth point being on the opposite side of said first point to said third point, whereby three successive mechanical impulses are sensed at said second point due to interaction of said current pulse with said second, first and third magnetic fields, respectively; and wherein said means responsive to said arrival of said mechanical impulse is responsive to a time interval between the first and second sensed mechanical impulses and to a time interval between the second and third sensed mechanical impulses.

7. Apparatus as claimed in claim 6, including means to determine the ratio between said two time intervals and thereby to determine said position of said first point in relation to the distance between said third and fourth points.

8. Apparatus as claimed in claim 7, including a clock pulse generator, and means to count the clock pulses generated during said respective time intervals.

9. Apparatus as claimed in claim 1, wherein said means to feed said current pulse comprises a circuit operative to charge electrical capacitance from a direct current source and to discharge said capacitance into said member.

10. Apparatus as claimed in claim 1, wherein said means to feed said current pulse operates at an intrinsically safe power level.

11. A liquid level indicating system, comprising: a container at least partially filled with liquid the level of the surface of which is to be measured; a taut elongate electrically-conductive member mounted substantially vertically and partly immersed beneath said liquid surface; first and second connection means electrically-connected to said member at connection positions respectively above and below said surface; float means arranged to float on said surface and to be guided by said member; a first magnet carried by said float means and adapted to apply a magnetic field to said member at a first point related to said liquid surface; a pulse generator connected to said first connection means and operable to feed a pulse of electric current along said member from said first connection means to the other, which current pulse interacts with said magnetic field as said current pulse travels past said first point thereby causing a mechanical impulse to propagate along said member; transducer means located along said member at a second point along said member to sense the arrival of said mechanical impulse at said second point; and time dependent means responsive to said arrival of said mechanical impulse at said second point to determine the position of said liquid surface.

* * * * *